March 14, 1961 P. R. VANCE 2,975,369

ELECTRONIC FUNCTION GENERATOR

Filed Dec. 30, 1955 4 Sheets-Sheet 1

INVENTOR.
Philip R. Vance
BY
[signature]
ATTORNEY

INVENTOR.
Philip R. Vance
BY
H. H. Oedham

INVENTOR.
Philip R. Vance
BY
A. H. Oldham
ATTORNEY

INVENTOR.
Philip R. Vance
BY
[signature]
ATTORNEY

United States Patent Office 2,975,369

Patented Mar. 14, 1961

2,975,369

ELECTRONIC FUNCTION GENERATOR

Philip R. Vance, Concord, Mass., assignor to Goodyear Aircraft Corporation, Akron, Ohio, a corporation of Delaware Filed Dec. 30, 1955, Ser. No. 556,581

2 Claims. (Cl. 328—143)

This invention relates to analog computers and more particularly to a function generator for use in connection with other computer apparatus and especially relates to an input unit which will generate an approximation of an arbitrary function by generating straight line segments thereof.

It is well known that any curve may be approximated by a series of segmental straight lines and that as the length of the segmental lines are shortened, the resulting trace approaches closer and closer to the curve.

While geometric curves may be quite accurately generated by mechanical function generators, the generation of an arbitrary function presents greater difficulties. It has been proposed heretofore to generate segments of an arbitrary curve and to provide a function by summing of the outputs of the segment generators. However, heretofore, it has been difficult to accomplish such a procedure in that it was found difficult to adjust the intercepts and slopes of the line segments and the slope of one line segment was not independent of the slope of another segment.

The present invention has for an object the provision of a function generator in which the slope of each segment of the line is independently adjustable of each other.

Another object is to provide for adjusting the intercepts of each segment without disturbing the adjustment of circuitry for generating another segment.

Other objects are to provide flexibility of apparatus to permit development of a wide variety of functions, and to provide an apparatus adapted to use with other analog computer apparatus.

These and other objects will appear from the following description and the accompanying drawings.

Figure 4:
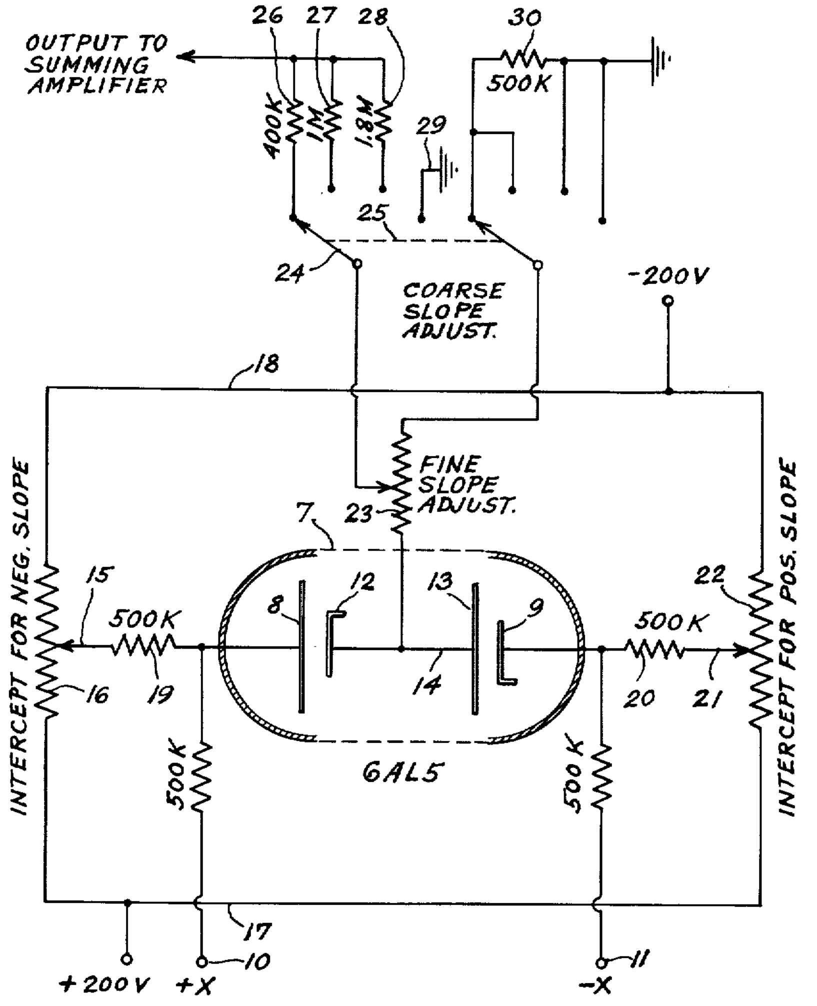
Fig. 4 is a diagram of a diode circuit for generating a single segment of a curve.
Figure 5A:
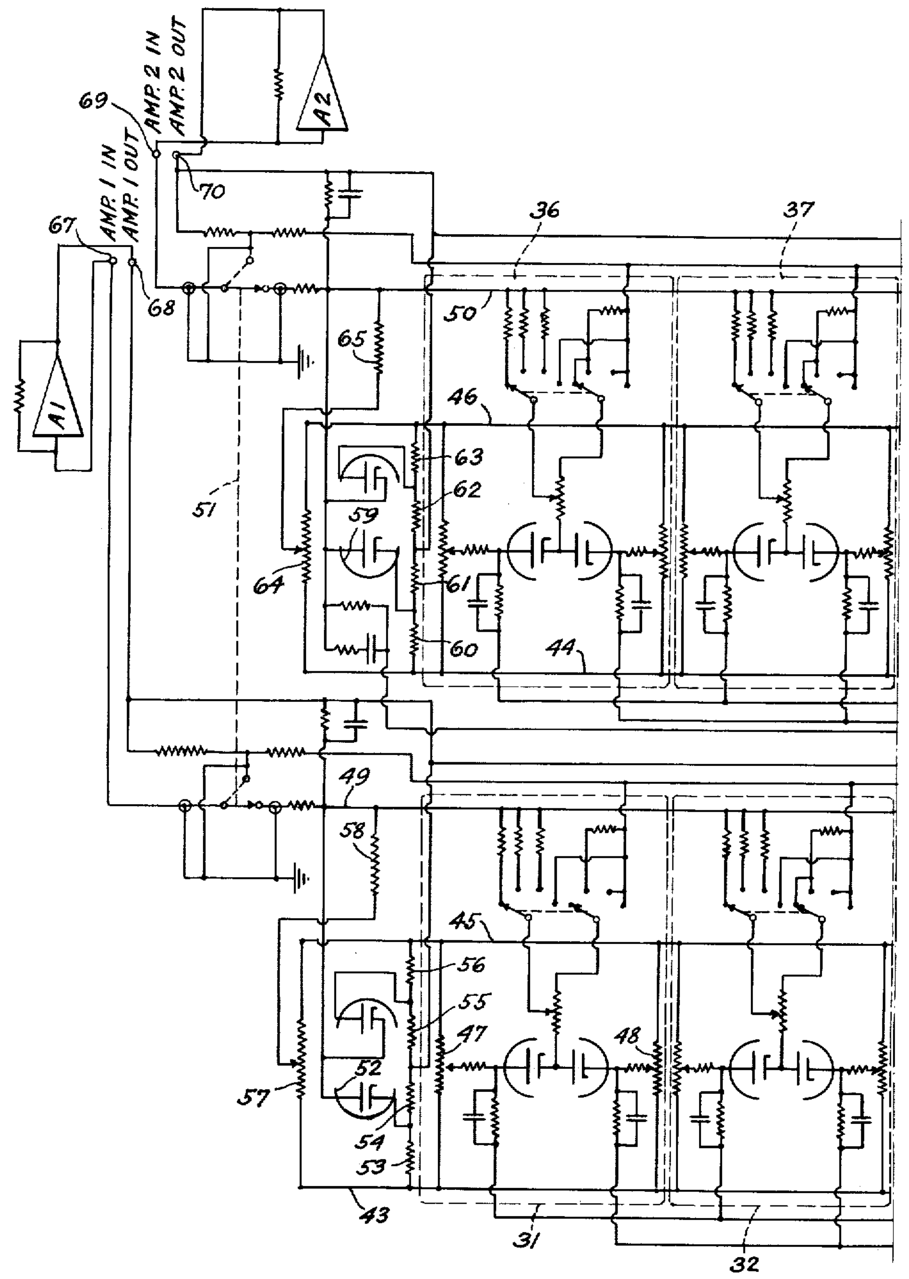

Fig. 5*a* is a simplified schematic circuit diagram of apparatus capable of generating a multiplicity of segments of one or more independent functions and employing a multiplicity of diode circuits such as that of Fig. 4.

Figure 5B:
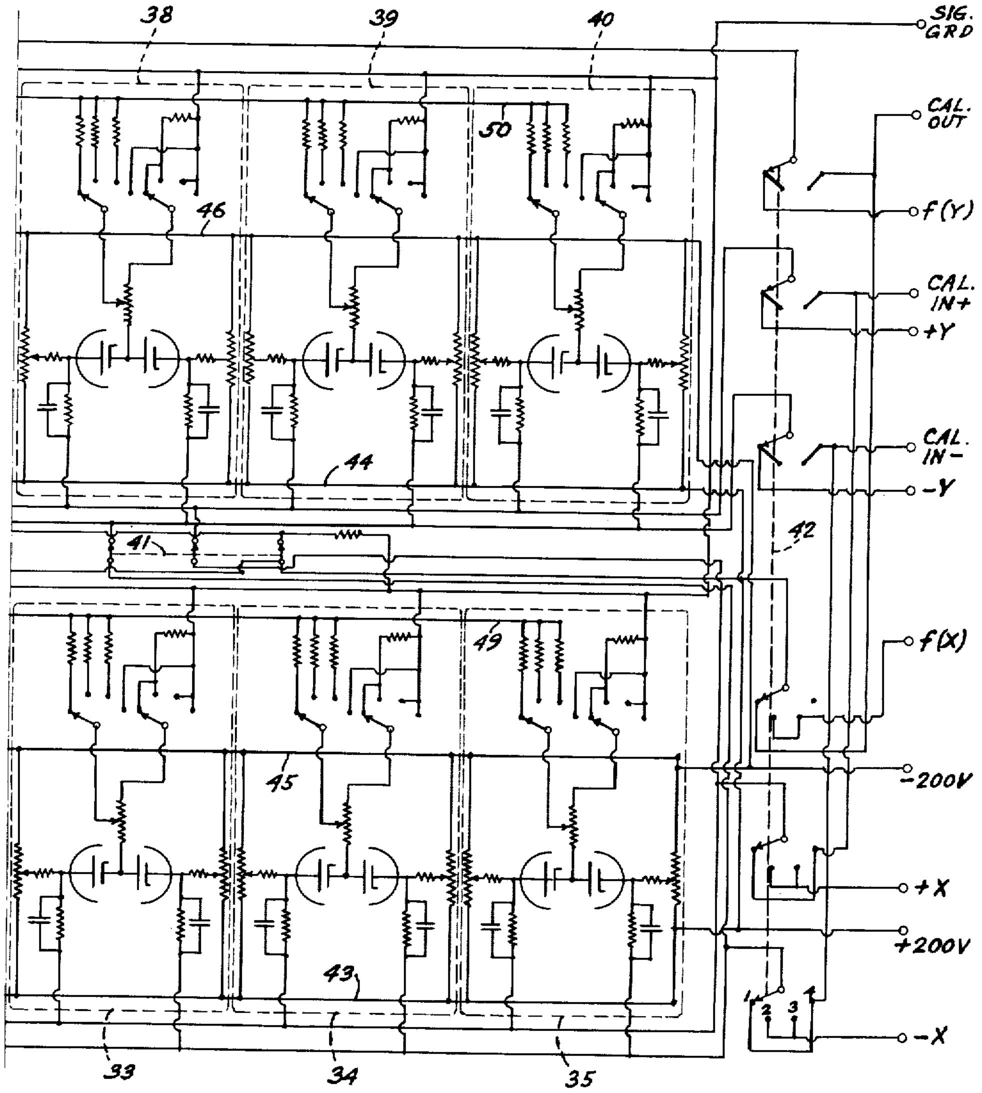

Fig. 5*b* is a continuation of Fig. 5*a*.

Figure 1:
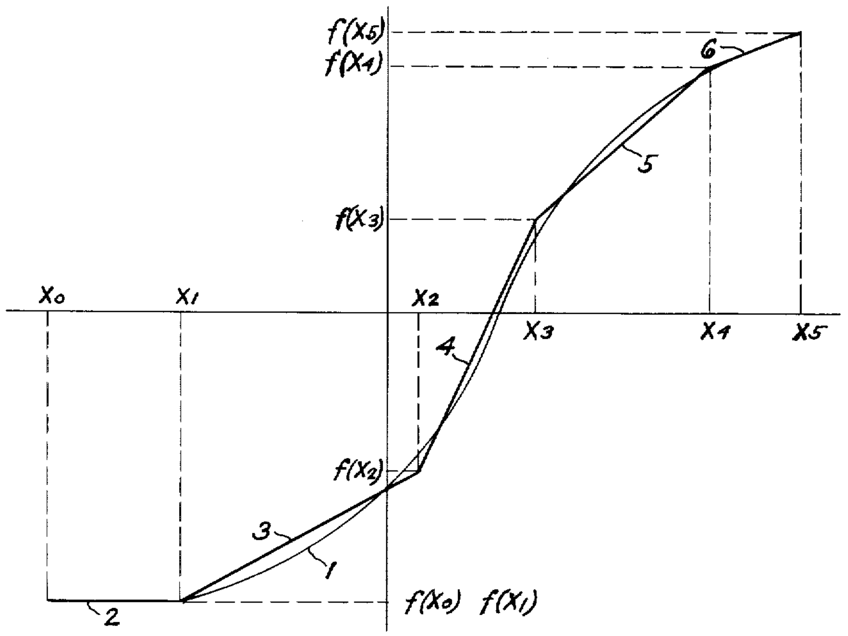
Fig. 1 is a graph showing an arbitrary curve with an approximation thereof by segmental straight lines.

Referring to the drawings, and first to Fig. 1 thereof, this shows a pair of coordinate axes and an arbitrary curve 1 plotted thereon. It will be seen that the curve 1 may be approximated by a number of straight line segments 2, 3, 4, 5 and 6. The present invention contemplates the generation of these straight line segments and the summation thereof. Each segment may be generated by a diode circuit such as that shown in Fig. 4 wherein a double diode tube 7, such as a 6AL5, has a signal voltage applied across the plate 8 of one half of the tube and the cathode 9 of the other half of the tube by way of terminals 10, 11 respectively while the remaining cathode 12 and plate 13 are connected together as at 14. A D.C. voltage is applied to the plate 8 through the arm 15 of a potentiometer 16 the end terminals of which are connected to a positively charged line 17 and a negatively charged line 18 respectively, the lines 17 and 18 preferably being charged at +200 volts and −200 volts respectively. By adjustment of the potentiometer arm, the plate potential may be varied. A plate load resistor 19 is inserted between the potentiometer arm and the plate 8.

Figure 2:
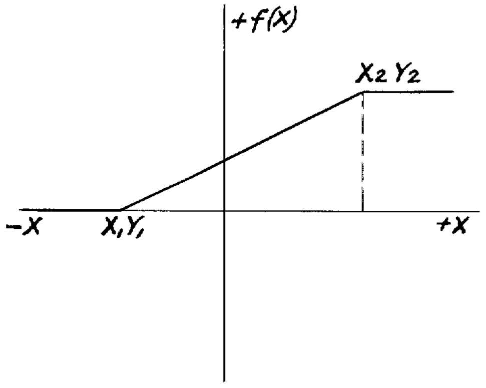
Fig. 2 is a graph showing a positive slope line segment.
Figure 3:
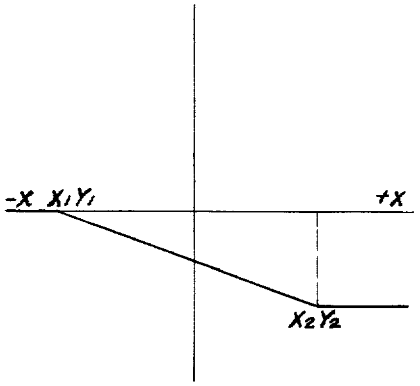
Fig. 3 is a similar graph showing a negative slope line segment.

In a similar manner the bias of cathode 9 is controlled by a cathode resistor 20 in series with the arm 21 of a potentiometer 22 spanning positively charged line 17 and negatively charged line 18. By adjusting the arms 15 and 21 of the potentiometers 16 and 22, the circuit may be adjusted so that the tube 7 starts to conduct at a desired intercept and does not conduct below such intercept. Referring to Fig. 2 of the drawings, this shows a pair of coordinate lines and a straight line segment $X_1Y_1$—$X_2Y_2$ plotted thereon and having positive slope. To generate such a line the tube should start conducting at intercept $X_1Y_1$ and the potentiometer 22 provides the proper adjustment. Referring to Fig. 3, this shows a segment $X_1Y_1$—$X_2Y_2$ having negative slope. For setting the circuit to start conducting at intercept $X_1Y_1$ the potentiometer 16 may be adjusted as it controls interception for negative slope.

For providing for adjustment of the circuit to change the slope of the generated segment the connection 14 may be connected to ground through one fixed terminal of a fine adjustment potentiometer 23, the adjustable contact of which is connected through one movable arm 24 of a double pole four position switch 25 through resistors 26, 27, or 28 selectively to a summing amplifier or through a line 29 to ground, and the opposite fixed terminal of the potentiometer 23 being connected through the other movable arm of switch 25 selectively to ground through the remaining portions of the switch, the switch 25 comprising the coarse slope adjustment and the potentiometer 23 comprising the fine slope adjustment of the diode circuit.

A number of diode circuits similar to that of Fig. 4 for generating a number of segments of an arbitrary curve corresponding to functions of X or of X and Y, may be combined in a single apparatus as shown schematically in Figs. 5*a*, 5*b* and the output of the segment generators may be summed or combined by feeding the combined output to one or more summing amplifiers. Also, in this circuit provision has been made for calibrating the apparatus and for preventing overloading of the diode circuits as well as for switching means for arranging the diode circuits in one or more groups.

In Figs. 5*a*, 5*b*, one of the diode circuits similar to that of Fig. 4 is designated by a dotted line enclosure 31 and similar diode circuits are designated by dotted line enclosures 32 to 40 inclusive. These segment generating diode circuits are arranged for convenience in two groups. Comprising in one group, diode circuits 31 to 35 inclusive, and in the second group diode circuits 36 to 40 inclusive. A three pole single throw switch 41 is provided whereby the two groups may be combined so as to provide for generating ten segments of one curve simultaneously or may be separated to provide for generation of two curves of five segments each.

A six pole four throw switch 42 is included in the circuit for setting the diode circuits for operation or for calibration, position 1 of this switch being for calibration of circuits 31 to 35 only, position 2 being the operating position, position 3 being the calibration position for circuits 36 to 40, and position 4 being the calibrating position for circuits 31 to 40. Provision is made for supplying a positive voltage at 200 volts to all of the diode circuits through bus lines 43, 44 and negative voltage at 200 volts to all the diode circuits through bus lines 45, 46. Each intercept potentiometer of each segment generating diode circuit, such as the potentiometers 47 and 48 of circuit 31 are bridged across these positive and negative bus lines. The output of diode circuits 31 to 35 are connected to a bus line 49 and the output of circuits 36 to 40 inclusive are connected to a bus line 50. These bus lines 49 and 50 may be connected to summing amplifiers through a double pole double throw switch 51.

To provide against overloading of the summing amplifier, especially when calibrating, a double diode 52 has its diode sections arranged in series with the plate of one section and the cathode of the other connected together and to output bus line 49 and the remaining cathode and plate being connected respectively at positions separated by resistors of a series of resistors, bridging positive bus line 43 and negative bus line 45, the line or resistors having a center tap grounded on a signal ground and the connection from the remaining cathode of tube 52 being between resistors 53, 54 of the series and the connection from the remaining plate of the tube 52 being between resistors 55, 56 of the series and the remaining cathode of tube 52 being normally at a more positive potential than the remaining plate. The arrangement is such that the tube 52 and its associated resistance network acts as a limiter to prevent overloading of the apparatus. For the same purpose, a tube 59 is connected across bus lines 44 and 46 in similar manner through resistors 60, 61, 62 and 63.

To provide means for adjusting the position of zero voltage of the function relative to the reference ordinate, a potentiometer 57 is bridged across bias lines 43 and 45 and its sliding contact is connected through a high resistance 58 to line 49. Similarly, a potentiometer 64 is shunted across lines 44 and 46 and its sliding contact is connected through a high resistance 65 with line 50. The arrangement is such that the relative elevation of generated segments may be adjusted with respect to a reference ordinate by adjusting the potentiometers 57 or 64.

Connecting posts 67, 68 are provided for connecting the output of diode segment generators 31 to 35 inclusive to a summing amplifier, designated A1, and connecting posts 69, 70 are provided to connect the output of generators 36 to 40 to a second summing amplifier, A2.

The heating circuits for the diodes have been omitted.

In operation of the apparatus, the heating circuits are closed and the plate and cathode voltages are applied for a number of hours. The circuits are then balanced. In setting up the diode circuits to generate segments of the desired curve the potentiometers individual to each diode generator are adjusted to the desired intercepts and slopes. This may be done without effecting the slope of other segments.

While a certain representative embodiment and details have been shown for the purpose of illustrating the invention, it will be apparent to those skilled in this art that various changes and modifications may be made therein without departing from the spirit and scope of the invention.

I claim:

1. An electronic function generator for generating an arbitrary function, said function generator comprising a series of segment generators for generating straight line segments, switching means for feeding negative and positive input signals to all of the segment generators or to selected groups thereof and for collecting for summation the combined output of all or selected groups of segment generators, each generator comprising reference voltage means, a pair of diodes having a cathode of one and a plate of another diode conductively coupled, the remaining elements of said diode pair being each conductively connected to movable contacts of potentiometers bridged across said reference voltage means to provide intercept adjustment, negative and positive input circuits conductively connected to said remaining elements of said diodes, said output circuits including coarse slope adjustment stepped attenuators and fine slope adjustment potentiometers means connected in series and to said pair of diodes at the conductively coupled elements thereof.

2. An electronic function generator for generating a segment of a curve, said generator comprising a pair of diodes, a low resistance connection between the cathode of the first diode and the anode of the second diode, a double pole multiple position switch, a separate resistance means connected to each of the multiple positions of one pole of the switch, said separate resistance means being of progressively greater value at each multiple position of said one pole of the switch, an output lead connected to each resistance means of said one pole, a ground connection to each of the multiple positions of the other pole of the switch, a potentiometer, a resistance connected in the ground connection to the first several multiple positions of the other pole of the switch, means connecting the potentiometer between the movable switch element of the said other pole connected to ground and the said low resistance connection, means connecting the movable contact of the potentiometer to the movable switch element of the said one pole connected to the output lead, a pair of potentiometers having their coils connected in parallel, a negative biasing voltage connected to one end of the potentiometers, a positive biasing voltage connected to the other end of the potentiometers, a resistance connected to the movable contact of one parallel connected potentiometer, a positive input voltage connected to the other end of the resistance and to the anode of the first diode, a resistance connected to the movable contact of the second parallel connected potentiometer, and a negative input voltage connected to the other end of the last-named resistance and to the cathode of the second diode.

References Cited in the file of this patent

UNITED STATES PATENTS

| | | |
|---|---|---|
| 2,285,044 | Morris | June 2, 1942 |
| 2,401,779 | Schwartzel | June 11, 1946 |
| 2,434,155 | Haynes | Jan. 6, 1948 |
| 2,520,761 | Giel | Aug. 29, 1950 |
| 2,697,201 | Harder | Dec. 14, 1954 |
| 2,831,107 | Raymond et al. | Apr. 15, 1958 |

FOREIGN PATENTS

| | | |
|---|---|---|
| 659,437 | Great Britain | Oct. 24, 1951 |
| 703,436 | Great Britain | Feb. 3, 1954 |

OTHER REFERENCES

A Diode Bridge Limiter for Use With Electronic Analogue Computers, by Medkeff and Parent, published in the A.I.E.E. Transactions, vol. 70, part I, pages 913–916.

Pub. I, "An Electronic Circuit for the Generation of Functions of Several Variables," IRE Convention Record, vol. 3, Part 4, pages 150–161.

Pub. II, "Accurate Linear Bidirectional Diode Gates," Proceedings of the IRE, January 1955, vol. 43, pages 29 and 30.

Pub. III, "A Technique for Non-Linear Function Generation," Electronic Engineering, March 1955, pages 118 and 119.